E. C. ROBERTS.
Fruit House.
No. 40,282.
Patented Oct. 13, 1863.
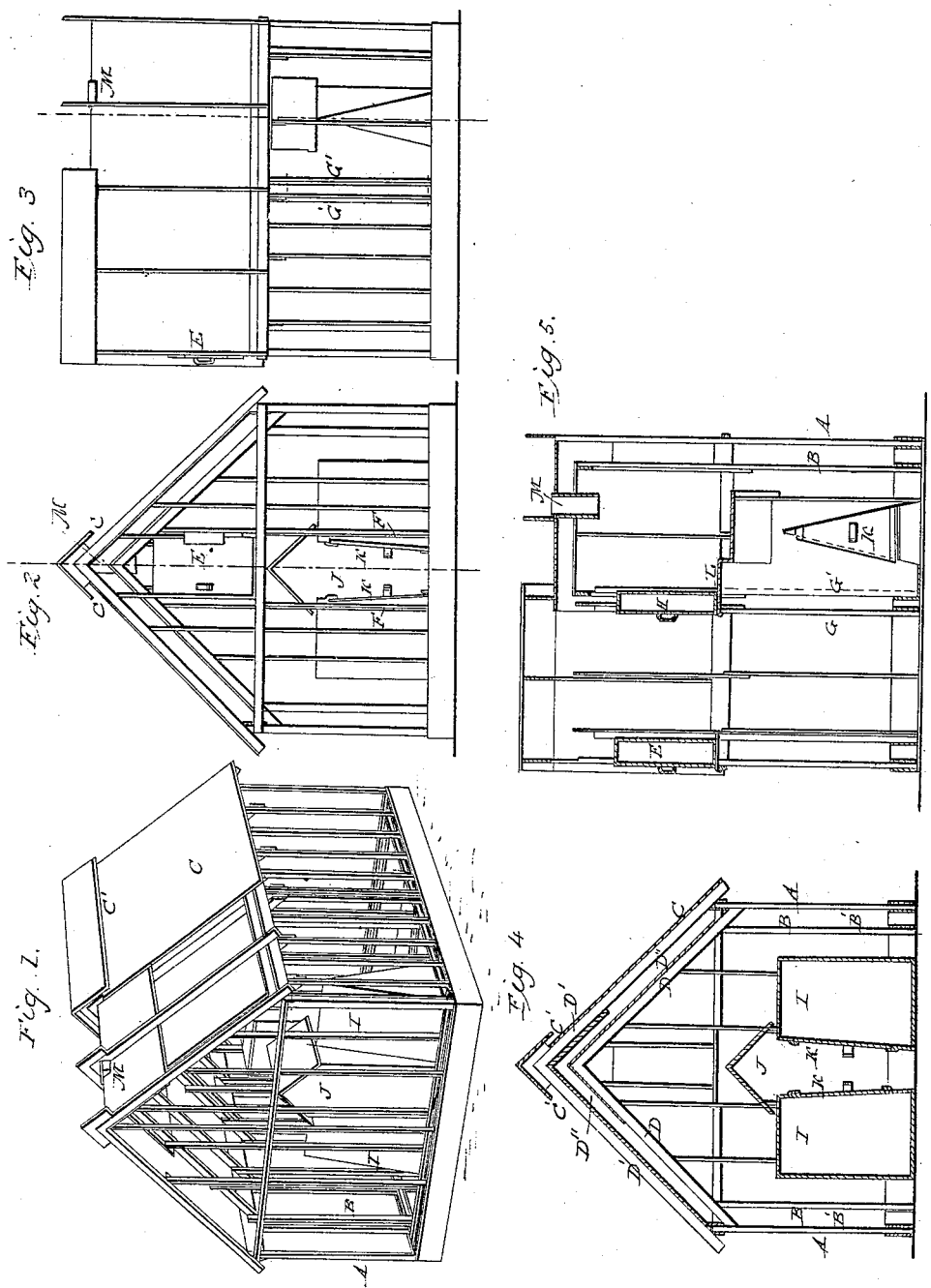
Attest
E. F. Cles
I. L. Dennis
Inventor.
E. C. Roberts

UNITED STATES PATENT OFFICE.

E. C. ROBERTS, OF SALEM, MICHIGAN.

IMPROVEMENT IN FRUIT-HOUSES.

Specification forming part of Letters Patent No. 40,282, dated October 13, 1863.

*To all whom it may concern:*

Be it known that I, E. C. ROBERTS, of Salem, in the county of Washtenaw and State of Michigan, have invented new and useful Improvements in Fruit Houses; and I do hereby declare that the following is a full and complete description of the construction of the same, reference being had to the accompanying drawings, making part of this specification, in which—

Figure 1 is a perspective view. Fig. 2 is an end view. Fig. 3 is a side view. Fig. 4 is a cross-section in the direction of the line $x\ x$ in Fig. 3, and Fig. 5 is a section in the direction of the line $x\ x$ in Fig. 2.

Like letters refer to like parts in the several views.

The nature of my invention relates to such a construction of a fruit-house that fruit or vegetables of any kind, fresh meat, or other kinds of organic bodies usually liable to decay, may be preserved in a fresh state, either in winter or summer, by means of ice and snow, or either, when said substances to be preserved are placed in boxes, packages, or other convenient means of storing, and kept at a low temperature by means hereinafter set forth.

My improved fruit-house is constructed very much like a double house—that is to say, one house within another. It may be built either of brick, stone, or wood. If built of brick or stone the outer wall should be hollow. If built of wood there should be two tiers of studding, A and B, and two tiers of rafters, C and D, are used, and which are placed about fourteen inches apart.

The interval B' between the studding is filled with some poor conductor of heat—as sawdust, spent tan-bark, pulverized charcoal, or other like substance—for the protection of the interior from the influences and action of the external air.

The space D' between the rafters is left vacant, so that the air that becomes heated can rise. Apertures for its escape are formed on each side of the ridge of the roof, as shown at C'. The space D'', like the space B', is to be filled with some poor conductor.

The floor of the house should be laid upon sleepers a little elevated from the ground and resting upon firm stone supports. The walls should also rest upon a firm foundation, and the ground so situated that there can be no accumulation of water beneath the building—in other words, perfect drainage should be secured. The floor should consist of boards not closely united, or otherwise furnished with small openings to allow the escape of any water from melted snow or ice. A thin covering of straw should first be spread upon the floor, and upon this there should be evenly strewed dry sawdust or spent tan-bark, to the thickness of five or six inches.

I make two doors in the front end of the house, one directly above the other, the upper one, E, only being shown, as the drawings represent a skeleton-frame for the purpose of better showing the inerior. The lower door occupies the space between the posts F F in Fig. 2.

The interior of the house is divided by a double partition, G G', the space between them being filled with sawdust or other poor conductor. I make two doors through this partition, corresponding in position to those already described, the upper one, H, only being shown. These doors, like the others, are made double, and the interior filled with some poor conductor of heat. The object in forming this partition is to have a back room, for keeping fruits and vegetables throughout the entire year, always ready for receiving them when they are gathered. To accomplish this a solid wall of ice about sixteen inches thick is laid around the outside of the room, leaving out a space at the door, the wall being carried as high as the foot of the rafters. Enough snow in a moist state should be placed between the blocks of ice, like mortar between bricks, to make the wall solid. The space between the inside tier of studding and the wall of ice should be closely packed with sawdust or other poor conductor. About eight or twelve inches from this wall of ice, upon the inside, I place the boxes or chambers I I J, for containing the fruit or other matter to be preserved. These are made three or four feet wide at the base, with oblique sides meeting at a point about eight feet from the floor, resembling a steep roof; or the sides may be slightly inclined, being about one foot less at the top than at the bottom, with a flat roof. These fruit-chambers are made by using small scantling or studding, and covering them on the outside with boards so that they will shed water. Their length is regulated by the size of the room, and the distance between each other and the wall of ice is from eight to twelve inches. The entrance to these chambers is by a sliding door, K, that faces the center of the hall or room in which they are placed, so that they are accessible from the passage running from the lower door to the rear of the room. This hall is made with studding, from eight to nine feet high, placed three or four feet apart at the base, and two or three feet apart at the top, and covered over the top with a roof tight enough to carry off water. The sides of the hall are covered the same as the boxes. The entrance to this hall in warm weather is through a trap-door, L, from above, immediately within the upper door, H, of the partition, and in cold weather through the lower door, a passage being left from the lower door of the front room to the lower door of the partition when the front room is occupied with fruit.

The fruit-chambers can be placed on both sides of the hall, with their entrance always facing it and a little within its sides, so that the slide-doors K can be moved freely.

Between the chambers and wall of ice, and between the fruit-chambers themselves, and over them and the hall, snow should be firmly packed and carried up some distance above them, and then several feet thickness of ice laid over the whole upper surface, from which a family can be supplied during the summer season. In the more southern latitudes, where the summers are long, ice should be pounded up and mixed with the snow.

The more tender fruits, like berries, should be canned, placed on shelves arranged against the sides of the chambers. Peaches and tropical fruits should be put in small boxes or baskets and also placed on shelves. Other fruits and vegetables can be placed in bulk in the chambers.

The front room is to be used in preserving fruit and vegetables in barrels and boxes. In the more northern latitudes this can be done from the beginning of winter until the middle of summer by the use of snow alone, if it is packed carefully and snugly around them. This outer room is also used during the period that the earlier and more tender fruits are ripening for temporary storage, and until their temperature is gradually lowered, so that they can be put into the chambers without liability to injury.

Again, when it is desired to remove fruits in considerable quantity from the chambers in the back room or hall in summer or autumn, such fruit thus removed should be allowed to stand in the outer room until the temperature is gradually raised, so that it can be taken out without sustaining injury by the change, for if suddenly exposed to the high temperature of summer a condensation of moisture takes place upon the surface, rendering the fruit wet and injuring its quality.

The object in constructing the chambers with sloping sides is to keep the snow in contact with them as it is gradually reduced by melting, thus keeping the temperature uniform in their interior.

The capacity of the fruit-house may vary in comparison to the amount of fruit to be stored. In each of the rooms there is a ventilator at the top, as seen at M in the several figures.

Double windows of thick glass may be used in the outer room, if desired.

What I claim as my improvement, and desire to secure by Letters Patent, is—

1. The construction of the chambers I I J, when used in a building for the purpose and in the manner and form herein described.

2. The combination of the chambers I I J, with a double-walled and double-roofed house, constructed in the manner and form substantially as herein described.

E. C. ROBERTS.

Witnesses:
E. F. OLDS,
I. L. DENNIS.